United States Patent [19]
Whelan

[11] 3,881,743
[45] May 6, 1975

[54] AUTOMOTIVE LEVELING SYSTEM

[75] Inventor: James E. Whelan, Dayton, Ohio

[73] Assignee: General Motors Corporation, Detroit, Mich.

[22] Filed: May 2, 1974

[21] Appl. No.: 466,157

[52] U.S. Cl. ............................ 280/124 F; 267/65 D
[51] Int. Cl. ............................................ B60g 17/04
[58] Field of Search ................ 280/124 F; 267/65 D

[56] References Cited
UNITED STATES PATENTS

| | | | |
|---|---|---|---|
| 3,610,611 | 10/1971 | Elliott | 280/124 F |
| 3,667,775 | 6/1972 | Whelan | 280/124 F |
| 3,703,298 | 11/1972 | Laverda | 280/124 F |

*Primary Examiner*—Philip Goodman
*Attorney, Agent, or Firm*—John P. Moran

[57] ABSTRACT

An automotive leveling system of the semiclosed-loop pneumatic type, wherein a flow sensor and switch are operatively connected between the height-control valve and air drier, the flow sensor including a diaphragm responsive to pressurized gas flow from the height-control valve. A relief valve is mounted on the diaphragm, and a switch is mounted adjacent thereto. In response to movement of the diaphragm, the switch alternately energizes two indicator lamps indicative of the sprung mass being either at or below trim height.

3 Claims, 4 Drawing Figures

AUTOMOTIVE LEVELING SYSTEM

This invention relates generally to leveling systems for automotive vehicles and, more particularly, to an indicator lamp system for monitoring the performance of a semiclosed-loop pneumatic leveling system.

Many different systems have been proposed for maintaining the sprung mass or body portion of an automobile at a particular height above the unsprung mass portion regardless of the load on the vehicle. One particular type of system which has found commercial acceptance is the semiclosed-loop type wherein compressed air is used as the leveling medium. In the closed-loop system an air compressor continuously supplies compressed air to the pneumatic leveling units whenever the engine of the vehicle is operating. A height-control valve monitors the height of the unsprung mass portion and controls the exhaust from the leveling units so that when the sprung mass portion is below the desired height, the exhaust is closed and the leveling units are pumped up by the compressor. When the desired height is achieved, the exhaust is opened and air is allowed to circulate from the leveling units back to the inlet of the compressor. A small tank is provided between the leveling units and the compressor and is preferably associated with an air drier which removes moisture as outside air is drawn into the system.

In accordance with the foregoing, an object of the invention is to provide an improved system for monitoring the performance of a semiclosed-loop type pneumatic vehicle leveling system.

Another object of the invention is to provide an improved leveling system monitoring arrangement wherein the flow of air from the height-control valve in semiclosed-loop leveling system is monitored to determine whether the vehicle sprung mass portion is at or below a desired height.

A further object of the invention is to provide an indicator lamp system for monitoring the position of the sprung mass portion by monitoring the air flow between the leveling units and the air drier.

Still another object of the invention is to provide a housing between the height-control valve and the air drier, the housing including an indicator lamp switch and a diaphragm having a flow-regulating check valve mounted thereon, air flow from the height-control valve causing pressure to build on the diaphragm so that the latter shifts to an extended position wherein the indicator lamp switch is actuated while the check valve opens to permit continuous air flow through the leveling system.

These and other objects and advantages of the invention will be apparent when reference is made to the following description and accompanying drawings, wherein.

Figure 1:
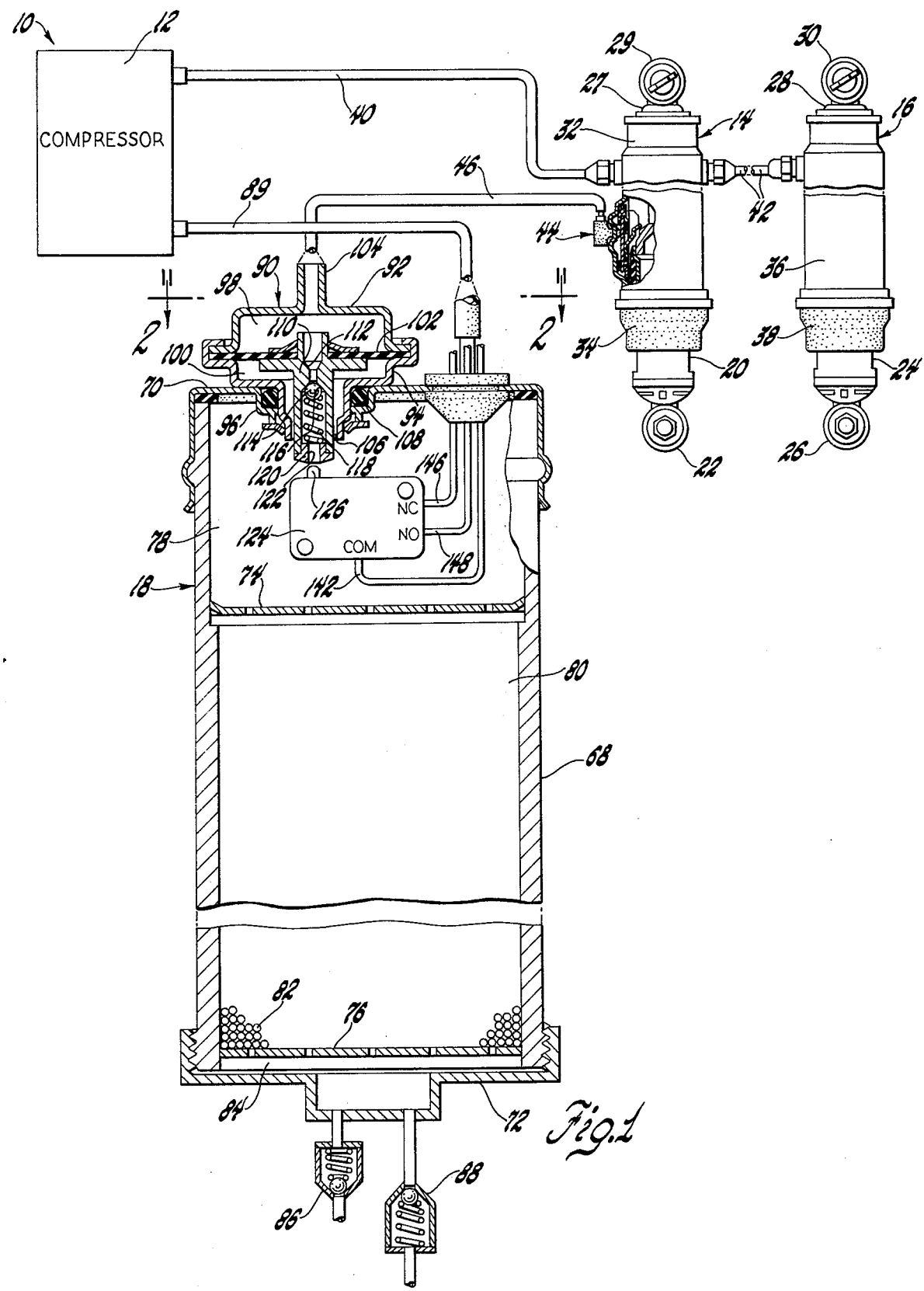
FIG. 1 is a schematic view of a semiclosed-loop type pneumatic leveling system embodying the invention.
Figure 2:
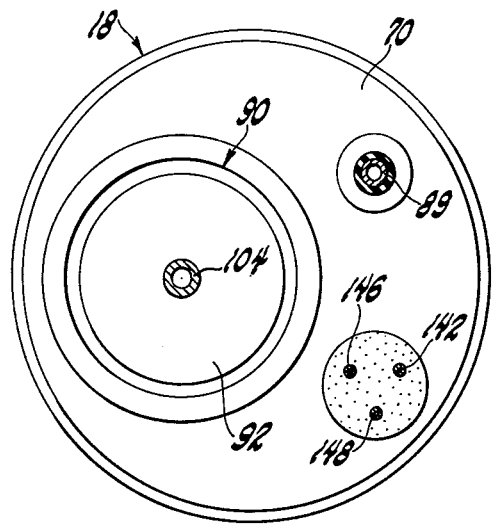
FIG. 2 is a view taken along the plane of line 2—2 of FIG. 1, and looking in the direction of the arrows.

Referring now to the drawings in greater detail, FIG. 1 illustrates a semiclosed-loop type automotive pneumatic leveling system 10 of the general type disclosed in U.S. Pat. No. 3,667,775, which issued Jan. 6, 1972 in the name of James E. Whelan. The system 10 includes an engine-driven air compressor 12, a pair of pneumatic leveling units 14 and 16, and an air drier assembly 18. The leveling unit 14 includes an inner cylinder 20 having rigidly attached to one end thereof a mounting eye 22, the leveling unit 16 having a similar inner cylinder 24 and mounting eye 26. Each of the cylinders 20 and 24 is filled with hydraulic fluid and slidably supports a conventional piston and rod subassembly, the rod 27 and 28 thereof projecting outwardly from the respective cylinders (not shown) and having rigidly attached to the outermost ends thereof respective mounting eyes 29 and 30. The eyes 22 and 26 are adapted for attachment to the unsprung mass portion of the vehicle, typically the rear axle, while the eyes 29 and 30 are adapted for attachment to the sprung mass portion of the vehicle, typically the frame or body portion. Accordingly, the leveling units 14 and 16 function in a conventional manner during jounce and rebound excursions of the sprung mass portion relative to the unsprung mass portion, to dissipate kinetic energy and thereby damp the jounce and rebound excursions. An outer cylinder or sleeve 32 is rigidly attached to the piston rod 27 in the unit 14 and cooperates with the inner cylinder 20 in defining an annular chamber closed at the lower end thereof by a flexible, rolling lobe-type seal 34. Similarly, the leveling unit 16 includes an outer cylinder or sleeve 36 which is attached to the piston rod 28 and cooperates with the inner cylinder 24 in defining an annular cylinder chamber closed at the lower end thereof by a rolling lobe-type seal 38.

The compressor 12 is driven by the engine of the vehicle through a conventional belt-drive arrangement, or the like (not shown), and delivers compressed air through a conduit 40 to the annular chamber in the leveling unit 14 whenever the engine is operating. A conduit 42 communicates between the annular chamber in the leveling unit 14 and the annular chamber in the leveling unit 16 so that both chambers are pressurized equally by the compressor 12. Accordingly, it will be apparent that introducing pressurized air into the annular chambers in the leveling units 14 and 16 effects telescopic extension of the units with consequent relative movement between the sprung and unsprung mass portions of the vehicle.

Figure 3:
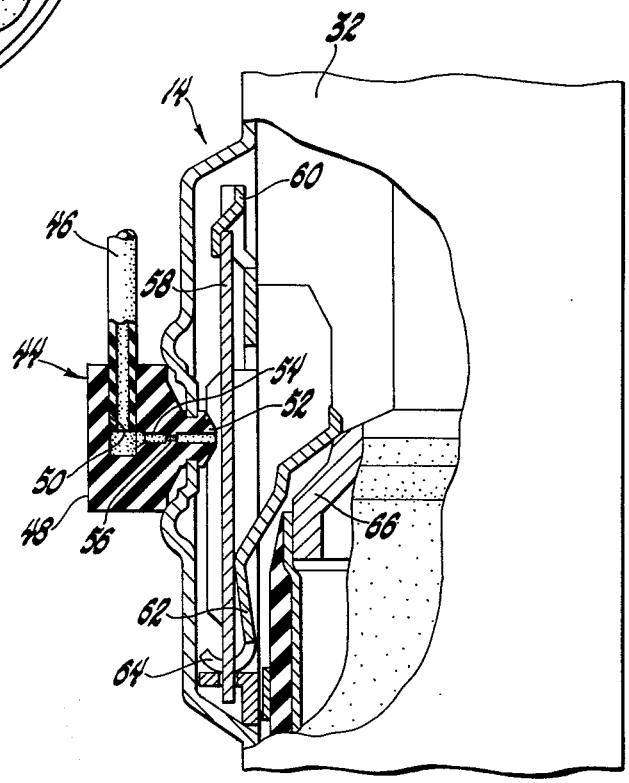
FIG. 3 is an enlarged fragmentary cross-sectional view of a portion of the FIG. 1 structure.

An exhaust control valve arrangement 44 is mounted on the leveling unit 14 and functions to selectively direct air from the annular chamber of the unit 14, and hence from the unit 16 also, to the air drier assembly 18, through a conduit 46. The exhaust valve arrangement 44 includes a plastic or hard rubber elbow 48 (FIG. 3) having a passage 50 formed therein, the conduit 46 being supported on the elbow 48 and communicating with the passage 50. The elbow 48 further includes a nose portion 52 which projects through an appropriate aperture in the outer cylinder or sleeve 32 for support thereon. A second passage 54 is formed in the elbow 48 and extends through the nose portion 52 to the passage 50, communicating between the annular chamber in the unit 14 and the conduit 46. A restricting orifice 56 is formed in the passage 54.

The valve arrangement 44 further includes an elongated valve element 58 rigidly secured at one end thereof to a bracket 60, the bracket 60 being secured, in turn, to the outer cylinder or sleeve 32 of the unit 14 for movement as a unit therewith. An outer actuator arm 62 is connected to the valve element 58 through a hooked end-portion 64 and overlies a cap 66 which closes the upper end of the inner cylinder 20. The outer actuator arm 62 is caused to pivot about the hooked end-portion 64 in response to vertical displacement of the sleeve 32 relative to the inner cylinder 20, thereby urging the valve element 58 into engagement with the nose portion 52 of the elbow 48, thus sealing or closing off the end of the passage 54, terminating communicating between the annular chamber in the leveling unit 14 and the conduit 46.

Referring once again to FIG. 1, it may be noted that the air drier assembly 18 includes a cylindrical tank 68 having a top 70, a bottom 72, and a pair of intermediate circular perforated dividers 74 and 76. A switch chamber 78 is formed within the assembly 18 between the divider 74 and the top 70. A chamber 80 is formed between the dividers 74 and 76 and is filled with a suitable desiccant material 82, such as 616 mesh silica gel. Still another chamber 84 is formed between the divider 76 and the bottom 72 and communicates with the ambient atmosphere via a pair of check valves 86 and 88, the check valve 86 controlling flow of air into the chamber 84, and the check valve 88 controlling air exhaust therefrom. A conduit 89 communicates between the switch chamber 78 and the compressor 12.

A flow-sensitive switch actuator 90 includes an upper housing element 92 and a lower housing element 94, the housing elements 92 and 94 being hem-flanged together in a conventional manner at the outer peripheries thereof. The lower housing elements 94 projects into the switch chamber 78 through a flanged aperture 96 formed in the top 70 of the air drier assembly 18. The housing elements 92 and 94 cooperate to define a closed interior space in the switch actuator 90, such space being divided into a first chamber 98 and a second chamber 100 by a flexible diaphragm 102 confined between the respective upper and lower housing elements 92 and 94. The conduit 46 is connected to the switch actuator 90 at a flanged aperture 104 formed in the upper housing element 92 to thereby provide communication between the annular chamber in the leveling unit 14 and the first chamber 98 and the switch actuator 90. An aperture 106 is formed in the lower housing element 94 to communicate between the second chamber 100 and the switch 78 in the tank 68. An O-ring seal 108 is mounted between the lower housing element 94 and the top 70 at the aperture 96 formed therein to prevent leakage from the switch chamber 78 and the ambient atmosphere.

A check ball housing 110 is mounted on the diaphragm 102 for movement as a unit therewith. A variable diameter passage 112 is formed through the housing 110 to provide communication across the diaphragm 102 between the respective first and second chambers 98 and 100. A check ball 114 is mounted in the lower portion of the passage 112 and urged toward a shoulder 116 formed therein by a spring 118. The spring 118 is seated on a cap 120 mounted on the housing 110 at the outlet of the passage 112. An opening 122 is formed through the cap 120 for permitting air flow from the passage 112 into the switch chamber 78.

Figure 4:
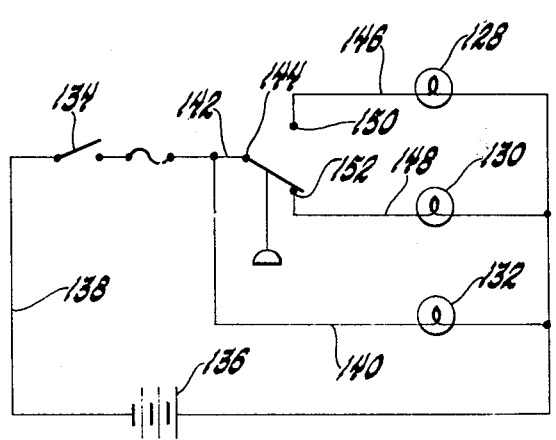
FIG. 4 is a schematic diagram of the electrical circuit embodied in the invention.

A two-position switch 124 is mounted on a wall of the tank 68 within the switch chamber 78. An operating button 126 extends from the switch 124 and bears against the cap 120 on the check ball housing 110. Thus, any vertical displacement of the check ball housing 110 will alter the position of the switch 124 through the button 126. The switch 124 is incorporated into an electrical circuit illustrated in FIG. 4, the circuit including a plurality of indicator lamps 128, 130, and 132 and the vehicle ignition switch 134. The ignition switch 134 is connected to a source of electrical potential 136, such as the vehicle storage battery, through a conductor 138 and functions, when closed, to energize the lamp 132 through a conductor 140. A conductor 142 branches from the conductor 140 and is connected to the common terminal 144 of the switch 124. A pair of conductors 146 and 148 connect the remaining terminals 150 and 152, respectively, of the switch 124 to the respective lamps 128 and 130 so that whenever the ignition switch 134 is closed, the lamp 132 and one or the other of the lamps 128 and 130 are energized to give a visual indicator signal at the instrument panel of the vehicle.

The vehicle leveling function of the system 10 is, of course, fully described in the aforementioned Whelan patent. Briefly, however, when the engine is started after the vehicle has been substantially loaded, the compressor 12 draws air from the tank 68 through the conduit 89 extending between the switch chamber 78 and the compressor 12. At this time the air contained in the tank 68 is insufficient to meet the demands of the compressor 12 and, accordingly, ambient air is drawn into the chamber 84 through the check valve 86. This ambient air is then drawn up through the desiccant material 82 which removes any moisture therefrom and thence through the switch chamber 78 to the compressor 12. Initially, the sprung mass is seated below curb or design height so that the valve element 58 (FIG. 3) closes the passage 54 to prevent any exhaust from the leveling units 14 and 16. Therefore, since only a slight vacuum is maintained within the tank 68, the diaphragm 102 and check ball housing 110 assume a raised position (FIG. 1), wherein the conductor 142 is connected by the switch 124 to the conductor 148 (FIg. 4), thereby energizing the indicator lamp 130 which is colored or otherwise designated to indicate that the sprung mass portion is below curb or design height. The air drawn through conduit 89 is compressed by the compressor 12 and delivered through the conduit 40 to the annular chamber in the leveling unit 14 and, thence, through the conduit 42 to the corresponding chamber in the leveling unit 16. As the pressure within the annular chambers increases, telescopic extension occurs between the sleeves 32 and 36 and the inner cylinders 20, 24, respectively, until the sprung mass portion achieves curb height. At this point, the outer actuator arm 62 abuts against the top of the inner cylinder 20, resulting in the valve element 58 opening the passage 54 in the elbow 48. With the passage 54 open, air is exhausted from the annular chambers in the leveling units 14 and 16 past the restricting orifice 56, through the conduit 46, and into the first chamber 98 (FIG. 1) of the switch actuator 90.

The check ball 114 is initially seated on the shoulder 116 under the force of the spring 118, causing the pressure within the first chamber 98 to rise to a predetermined level. The spring 118 is relatively weak, however, so that no significant back-pressure is created in the conduit 46 which might tend to retard exhaust through the restricting orifice 56. The pressure level within the first chamber 98 is, however, sufficient to effect downward deflection of the diaphragm 102 and, hence, concurrent downward deflection of the check ball housing 110. This deflection effects concurrent downward movement of the button 126 on the switch 124, which movement disconnects the conductor 142 from the conductor 148 and connects it to the conductor 146. Accordingly, the indicator lamp 130 is deenergized and the indicator lamp 128 is energized, the latter being colored or otherwise designated to indicate that the sprung mass portion is at curb height or, in other words, level. When the predetermined pressure is achieved within the first chamber 98, the check ball 114 is unseated, thus permitting continuous flow of exhaust air from the conduit 46 into the switch chamber 78 and thence back to the compressor 12 through the conduit 89. During this phase of operation, substantially no ambient air is required so that the air within the system flows in a closed loop from the compressor 12 to the leveling units 14 and 16, to the air drier assembly 18, and back to the compressor 12.

The valve element 58 is, of course, undamped so that during dynamic operation, the valve element 58 continuously opens and closes the passage 54 in response to transient jounce and rebound deflections of the unsprung mass portion of the vehicle. The restricting orifice 56, however, functions to retard the exhaust of air from the leveling units 14 and 16 during these transient deflections. In accordance with the teaching of the aforementioned Whelan patent, the restricting orifice 56 is sized to maintain a predetermined pressure condition in the exhaust conduit 46 and, hence, in the first chamber 98 of the switch actuator 90, under all conditions of operation. Therefore, under all operative conditions, after the sprung mass portion has achieved the desired height relationship with respect to the unsprung mass portion, the switch 124 will be maintained in a position which energized the indicator lamp 128.

It should be apparent that the invention provides an improved, simplified, and dependable pressure-sensing means and associated electrical indicator means for use in conjunction with a vehicle leveling system.

While but one embodiment of the invention has been shown and described, other modifications thereof are possible.

I claim:

1. In an automatic vehicle leveling system of the semi-closed loop type including an air compressor operable continuously during operation of said vehicle to supply pressurized air to a leveling unit disposed between a sprung mass portion and an unsprung mass portion of said vehicle, a height-control valve disposed between said sprung and said unsprung mass portions and connected to an exhaust port of said leveling unit for closing said exhaust port when said sprung mass portion is below a predetermined height relative to said unsprung mass portion and for opening said exhaust port when said sprung mass portion at least achieves said predetermined height, and an air drier assembly disposed in a conduit extending between an exhaust port of said height-control valve and an inlet port of said compressor and including a system inlet and exhaust assembly, an improvement comprising pressure-sensing means disposed in said conduit between said height-control valve exhaust port and said air drier and including a movable control element assuming a first position when said conduit is pressurized to a predetermined superatmospheric level corresponding to the open position of said leveling unit exhaust port and a second position when the pressure in said conduit is below said predetermined level corresponding to the closed position of said leveling unit exhaust port, electrical circuit means including a source of electrical potential and a pair of electrically energized indicator means for signalling respectively when said sprung mass portion is below and at least achieves said predetermined height, and electrical switch means operatively connected to said control element and disposed in said circuit means between said source and said indicator means for energizing respective ones of said indicator means when said control element is in a corresponding one of said first and said second positions.

2. In an automatic vehicle leveling system of the semi-closed loop type including an air compressor operable continuously during operation of said vehicle to supply pressurized air to a leveling unit disposed between a sprung mass portion and an unsprung mass portion of said vehicle, a height-control valve disposed between said sprung and said unsprung mass portions and connected to an exhaust port of said leveling unit for closing said exhaust port when said sprung mass portion is below a predetermined height relative to said unsprung mass portion and for opening said exhaust port when said sprung mass portion at least achieves said predetermined height, and an air drier assembly disposed in a conduit extending between said height-control valve exhaust port and an inlet port of said compressor and including a system inlet and exhaust valve, an improvement comprising a housing defining an inlet and an outlet, said housing being disposed in said conduit between said air drier and said height-control valve exhaust port with said inlet communicating with the latter and said outlet communicating with said air drier, a diaphragm disposed in said housing for dividing the interior of said housing into a first chamber communicating with said inlet and a second chamber communicating with said outlet and including a central portion movable between a retracted position corresponding to the closed position of said height-control valve exhaust port when the pressure in said first and second chambers is equalized and an extended position corresponding to the open position of said height-control valve exhaust port when the pressure in said first chamber exceeds the pressure in said second chamber, means biasing said diaphragm central portion toward the retracted position, pressure-regulating check valve means on said diaphragm central portion operative to permit a regulated flow of air between said first and said second chambers whenever a pressure differential exists therebetween so that a continuous flow of air is maintained whenever said height-control valve exhaust port is open and operative to prevent air flow from said second to said first chamber, electrical circuit means including a source of electrical potential and a pair of electrically energized indicator means for signalling respectively when said sprung mass portion is below and at least achieves said predetermined height, and electrical switch means operatively connected to said diaphragm central portion and disposed in said circuit means between said source and said indicator means for energizing respective ones of said indicator means when said diaphragm central portion is in a corresponding one of said first and said second positions.

3. An automotive leveling system of the semi-closed loop type comprising an air compressor operable continuously during operation of said vehicle to supply pressurized air to a leveling unit disposed between a sprung mass portion and an unsprung mass portion of said vehicle, a height-control valve disposed between said sprung and said unsprung mass portions and connected to an exhaust port of said leveling unit for closing said exhaust port when said sprung mass portion is below a predetermined height relative to said unsprung mass portion and for opening said exhaust port when said sprung mass portion at least achieves said predetermined height, an air drier assembly disposed in a conduit extending between said height-control valve exhaust port and an inlet port of said compressor and including a system inlet and exhaust valve, an improvement comprising a housing defining an inlet and an outlet, said housing being disposed in said conduit between said air drier and said height-control valve exhaust port with said inlet communicating with the latter and said outlet communicating with said air drier, a diaphragm disposed in said housing for dividing the interior of said housing into a first chamber communicating with said inlet and a second chamber communicating with said outlet and including a central portion movable between a retracted position corresponding to the closed position of said height-control valve exhaust port when the pressure in said first and second chambers is equalized and an extended position corresponding to the open position of said height-control valve exhaust port when the pressure in said first chamber exceeds the pressure in said second chamber, means biasing said diaphragm central portion toward the retracted position, pressure-regulating chack valve means on said diaphragm central portion operative to permit a regulated flow of air between said first and said second chambers whenever a pressure differential exists therebetween so that a continuous flow of air is maintained whenever said height-control valve exhaust port is open and operative to prevent air flow from said second to said first chamber, electrical circuit means including a source of electrical potential and a pair of electrically energized indicator lamps for signaling respectively when said sprung mass portion is below and at least achieves said predetermined height, and an electrical switch operatively connected to said diaphragm central portion disposed in said circuit means between said source and said indicator lamps for energizing respective indicator lamps corresponding to said first and said second positions of said diaphragm central portions.

* * * * *